Figure 1:
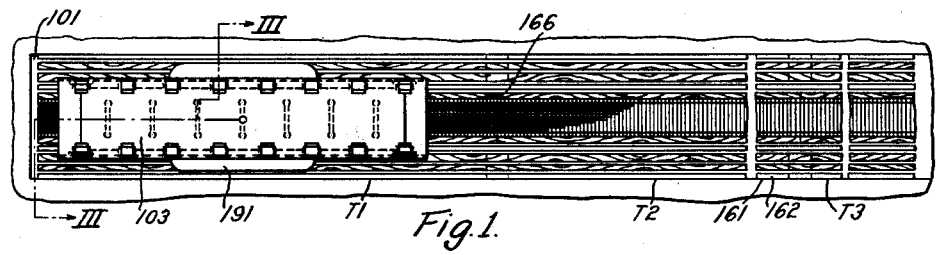

Dec. 10, 1946.   M. F. JONES ET AL   2,412,512
FEEDER SYSTEM FOR LINEAR MOTORS
Filed Oct. 14, 1943

INVENTORS
Maurice F. Jones and
Lee A. Kilgore.
BY O. B. Buchanan
ATTORNEY

UNITED STATES PATENT OFFICE 2,412,512

FEEDER SYSTEM FOR LINEAR MOTORS

Maurice F. Jones, Wilkinsburg, and Lee A. Kilgore, Forest Hills, Pa., assignors to Westinghouse Electric Corporation, East Pittsburgh, Pa., a corporation of Pennsylvania Application October 14, 1943, Serial No. 506,198

7 Claims. (Cl. 172—290)

Our invention relates to the polyphase feeder arrangement for the squirrel-cage track-member of a linear motor, and particularly a linear motor in which the movable element is the polyphase-motored towing-car of an electric catapult for launching aircraft, in the launching-arrangement which is described and claimed in an application of Frank B. Powers, Serial No. 473,843, filed January 28, 1943, and assigned to the Westinghouse Electric & Manufacturing Company.

The general arrangement consists of a long track-member having two track-rails, a laminated squirrel-cage core between the two track-rails, and a third-rail structure on each side of the two track-rails, and a polyphase-motored towing-car having wheels which run on the track-rails, a laminated polyphase-wound core which cooperates with the squirrel-cage core of the track, and a current-collecting means for cooperating with the third-rail structure on each side of the car, whereby two of the phases are obtained from the two third-rail structures, while a third phase is obtained from the track-rails. Preferably, the track-sections are made in substantialy completely prefabricated sections which are mounted on skids for easy installation, and which are complete, with the third-rail structures carried by the track-structure, so that the track-sections are ready to be hauled into place, in a hollow trench dug in a flying-field, and ready for service as soon as the track-sections are joined together. The general structural design-features of the linear-motor catapult, as just described, are described and claimed in an application of Maurice F. Jones, Serial No. 506,197, filed October 14, 1943.

Our present invention has to do particularly with the means for getting the three-phase power into the track-member, including the third-rail structures, and thence into the towing-car. It is quite desirable that all three phases of the three-phase power should be fairly well balanced, and that the impedance-losses in the feeder-system should be reasonably low, because it is desirable, for safety reasons, to use a fairly low voltage of several hundred volts, which means the use of rather high currents which are necessary to energize a towing-car of sufficient power to be of any practical use in aiding in the launching of aircraft. In fact, the currents utilized are so high that they are very much higher than the highest current ever heretofore collected for feeding into a moving car in any railway system.

In any practical construction, such as would ordinarily be built, in the present state of the metallurgical arts, the track-rails and the third-rails would all be made of steel or other magnetizable material which has a considerable impedance to the flow of alternating currents at 60 or 80 cycles, which is the frequency-range at present preferred. This impedance takes the form, not only of a high reactance because of the high magnetic fluxes which traverse the magnetizable members, but particularly a very high resistance-loss in the form of hysteresis and eddy-current losses.

Even aside from the use of magnetizable materials for the track-rails and the third-rails, even though these rails were of low-impedance non-magnetizable material, the reactance of a three-phase supply-system in which the phases were as widely separated as the two outside third-rail structures, with the track-rails constituting the intermediate phase, would be fairly high, and the reactance between the two outside phases would not be the same as the reactance between the middle phase and either one of the two outside phase, so that there would be a problem of an undesirably high reactance and an unbalanced reactance.

An object of our present invention, therefore, is to provide a three-phase feeder-system for an electrified track of the type described, in which a set of three three-phase feeder-conductors of non-magnetizable material is disposed along each side of the track. Phase-A of the feeder-group on one side of the track is connected, at frequent intervals, to the third-rail structure at that side; another phase, such as phase-C of the other set of feeders, on other side of the track, is connected, at frequent intervals, to the third-rail structure on that side of the track; and a plurality of sets of three three-phase non-magnetizable cross-connectors are provided to extend under the track-rails and to join the corresponding phases of the two sets of feeder-conductors at a plurality of spaced points along the track, with connections from a third phase, such as phase-B of each of the sets of cross-connectors to the track-rails of the track.

A further object of our invention is to utilize, for each set of three three-phase feeder-conductors, and for each set of three three-phase cross-connectors, flat strips of non-magnetizable material, with their flat sides closely spaced from each other. The close spacing of the strips considerably reduces their reactance, while the use of conductors in the form of flat strips, as distinguished from round-cross-sectioned cables, is advantageous in making a compast three-phase feeder-arrangement having a general overall cross-section approximating that of a circle, while maintaining broad-areaed, short, air-gaps between the several phases. While this flat-strip construction is not essential, it is a desirable feature of our invention, in its more specific aspects.

Further objects of our invention relate to the various details of construction, such as utilizing laminated or flexible non-magnetizable strip-conductors for the feeder-phases which are connected to the respective third-rail structures, while utilizing solid-bar strips for the other feeder-phases, the flexible construction being advantageous in permitting the flexible strip to readily buckle, as a result of thermal expansions and contractions, without buckling the third-rail structure to which the flexible strip is connected at two or more points. As a practical detail, the various sets of three-phase cross-connectors which are disposed underneath the track-rails are made of three flat strip-conductors disposed one above the other, with the top and bottom conductors transposed, at some point intermediate between the track-rails, and with the central conductor connected to the two track-rails.

Figure 2:
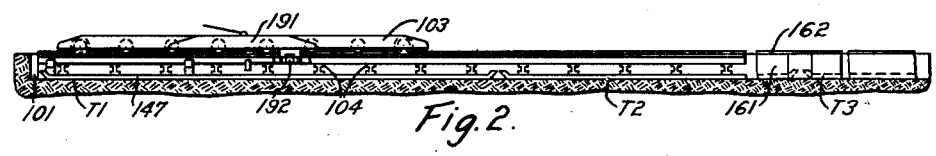
Figure 3:
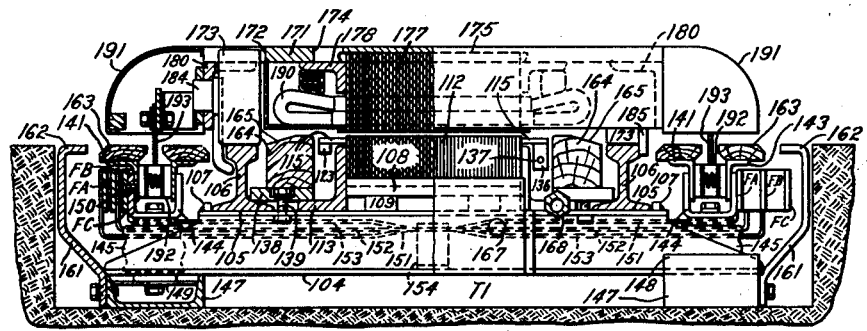
Figures 4, 5:
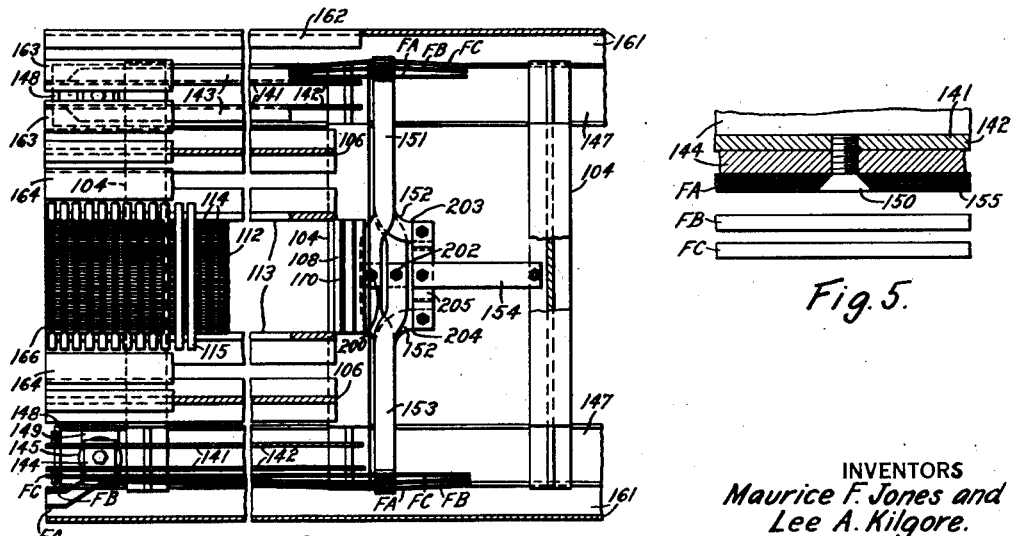

With the foregoing and other objects in view, our invention consists in the combinations, systems, methods, apparatus and parts, hereinafter described and claimed, and illustrated in the accompanying drawing, wherein Figure 1 is a longitudinal plan-view of a portion of a landing or launching field, with our linear-motor catapult installed, Fig. 2 is a side view thereof, showing the track-element of the linear motor, installed in a trench or shallow ditch dug in the flying-field, Fig. 3 is an end view of the linear-motor, including both the car-element and the track element in a trough in the flying-field, with half of the equipment shown in transverse section, as indicated by the section-line III—III in Fig. 1, Fig. 4 is a plan view of a part of a track-section, with parts broken away to show the construction, and Fig. 5 is a detail of one of the sets of three three-phase feeders, showing the laminated feeder-phase which is connected to the adjacent third-rail structure.

As shown in Figs. 1 and 2, the track-element is laid in a shallow ditch or trough 101, in a landing-field or launching-field, so that the top of the track will come approximately flush with the surface of the landing-field. The track-element, as illustrated, is made up in the form of a plurality of at least partially prefabricated track-sections T1, T2, T3, etc., said track-sections having squared-off abutting ends which are joined together in a straight line. The movable element of the linear motor is a low, flat, elongated, polyphase-motored towing-car 103, which rides on the track-element.

As shown in Figs. 2 and 3, each track-section T1, T2, etc., comprises a plurality of cross-ties 104, which are shown in the form of steel H-beams. The top flange of each cross-tie 104 has two track-rail seats 105, for receiving the two track-rails 106, respectively. Preferably, the track-rail seats 105 are bordered, on the outside, by abutments 107 which are carried by the cross-ties for determining the alignment or spacing of the track-rails 106. Between the two track-rail seats 105, each cross-tie 104 carries a core-supporting cross-member 108, which is mounted on the top of the cross-tie, as by means of supporting-blocks 109.

As shown in Figs. 3 and 4, each of the core-supporting cross-members 108 has a dovetailed groove 110 cut in its upper surface, for making a dovetail joint with a plurality of vertical, longitudinally extending magnetizable laminations which constitute a laminated core-member 112. The core-laminations 112 are clamped together, at each end of the stack of laminations, that is, along each side of the core, by means of one of two angle-iron clamping-pieces 113 which are secured to the top flanges of the several cross-ties 104 which make up that track-section. The core-clamping angle-pieces 113 thus constitute longitudinally extending members, extending longitudinally of the track, and rigidly joining together the various cross-ties 104 of each prefabricated track-section. The laminated core 112 of each track-section has a plurality of transversely extending slots 114 therein, which receive squirrel-cage bars 115, the ends of which are joined, on each side of the core, by suitable end-connections 123.

At each end of each of the track-sections, as shown on the right-hand side of Fig. 3, a flexible electrical connector 136 is provided, for continuing the end-connections of the squirrel-cage winding from one track-section to the next. The flexible end-connections 136 are provided with holes 137 for bolting on to the corresponding end-connector of the next track-section.

Each track-section T1, T2, etc., also carries, as a prefabricated part thereof, a plurality of insulatedly mounted third-rail structures, one on each side of the track, outside of the respective track-rails 106. In the illustrated form of the invention, each third-rail structure is in the form of two angle-iron rails 141, having vertical flanges 142 which are spaced from each other, and having top-flanges 143 which extend out away from the space between the two vertical flanges 142. The pair of third-rails 141, on each side of the track-structure, is mounted on a plurality of U-shaped supporting-brackets 144, which are supported on insulators 145 which are, in turn, supported from the cross-ties 104 of the track-section.

In the illustrated form of embodiment of the invention, the cross-ties 104 of each track-section are mounted on channel-sectioned skids 147, the ends of which are turned up, as indicated at 148, to facilitate hauling the various track-sections into place on the landing-field. The channel-member skids 147 also constitute a convenient abutment for the lower ends of the third-rail insulators 145, which are shown, in Fig. 3, as being mounted on plates 149 secured within the channel-member skids 147, thus being supported from the bottoms of the cross-ties 104, to which the skids are connected.

In accordance with our invention, each track-section has two sets of three three-phase feeder-conductors FA, FB and FC, extending the entire length of the track-section, a complete set of three feeders being disposed along each side of the track-section, outside of the respective third-rail structures 141. Preferably, the feeder-conductors FA, FB and FC are flat, vertically disposed strips of copper or other non-magnetizable conductors, having their flat sides closely spaced from each other, in order to reduce the reactance. The extreme ends of the feeders FA, FB and FC of each track-section may be bent out a little further apart from each other, in order to facilitate the making of electrical end-connections from one track-section to the next.

The phase-conductor FA of the three-phase feeder-assembly FA, FB and FC on one side of the track-section is disposed adjacent to the outer rail 141 of the third-rail assembly on that side of the track-section, and is electrically and mechanically secured thereto, at a plurality of points, as by being bolted by the same bolts or screws 150 which secure the U-shaped supporting-brackets 144 to the third-rails 141. On the other side of the track-section, another phase, indicated by the phase-conductor FC of the feeder-assembly FA, FB and FC, is disposed adjacent to its corresponding outer third-rail 141, and similarly secured thereto at a plurality of points.

At a plurality of points along the entire track, preferably once for each of the track-sections T1, T2, T3, etc., a set of three three-phase cross-connectors 151, 152 and 153 are disposed underneath the track-rails 106 and the track-core 112 for connecting the corresponding phases of the two feeder-assemblies FA, FB and FC on the two sides of the track. Preferably, each set of three three-phase cross-connectors 151, 152 and 153 consists of flat strips of non-magnetizable conducting material, disposed with their flat sides horizontal, and lying one above the other in closely spaced relation, except that the top and bottom conductors 151 and 153 are transposed, somewhere in the center of the track-section, so that they may be conveniently connected to the inner and outer phase-conductors of the two sets of feeders FA, FB and FC on the two sides of the track-section. The intermediate cross-connector 152, which is connected to the two intermediate phase-conductors FB of the two sets of feeders, is centrally connected, by means of a strip-conductor 154, to the bottom flange of one of the cross-ties 104, and thence to the two track-rails 106 which are supported by the top flange of said cross-tie.

As shown in Fig. 5, we prefer to utilize a special construction for the feeder-conductor which is disposed adjacent, and connected at frequent points, to the outer third-rail 141 on that side of the track-section. We refer to the feeder-phase FA on one side of the track, and the feeder phase FC on the other side. As shown in Fig. 5, the feeder-phase which is connected to the third-rail is made of a laminated strip-construction, as shown at 155 in Fig. 5, or otherwise composed of a plurality of pieces of thin conductors, whereby said strips are relatively flexible, so as to prevent bending the associated third-rail when said flexible feeder-strip expands and contracts as a result of heating because of the electric current flowing therein. The remaining phases of the feeder-strips FA, FB and FC, on both sides of the track, are of solid-bar construction, of a good conducting, non-magnetic material such as copper.

A special rail-fastening means is shown, in Fig. 3, for securing the two track-rails or running-rails 106 to the several cross-ties 104, with the outer edges of the bottom flanges of the rails in contact with the rail-aligning abutments 107. This special rail-fastening means includes a plate-like member 138 having one edge which is engageable at the junction between the rail-web and the base-flange of the rail, at the side of each track-rail opposite to the side which is engaged by said abutment 107. The plate-like member 138 is drawn down tightly toward the cross-tie 104 by means of a bolt or screw 139, which forces the rail into tight engagement with both the rail-seat 105 and the abutment 107 at the top of the cross-tie 104. This provides a simple and effective fastening-means whereby the track-rails 106 may be quickly fastened into place, with a minimum of lost motion, when the track-sections are assembled in the field.

As shown in Fig. 3, each track-section is also provided with lateral guard-members 161 which are carried by the track-section supporting-structure, as, for example, by the two skid-members 147, for guarding the track-section while it is being put into place within its trough 101 in the flying-field, and also to prevent dirt and rubble from falling into the track-section from the sides of the trough. The two guard-members 161 have inwarly turned top-flanges 162 which are substantially flush with the top of the flying-field.

The top surfaces of all of the parts of the entire track-structure are preferably substantially flush with the level of the flying-field. The tops of the two third-rails 141 of each of the third-rail assemblies, four rails in all, are preferably covered and protected by wooden or other insulating cap-strips 163, the tops of which are approximately flush with the landing-field. The tops of the track-rails 106 are also preferably approximately flush with the landing-field. The top of the squirrel-cage core 112 is also approximately flush or level with the flying-field, but preferably very slightly higher than the flying-field, as indicated in Fig. 3.

Preferably, also, two wooden beams or other insulating fillers 164 are utilized, to partially fill the space between the end of the squirrel-cage winding and the inner sides of the rail-heads of the two track-rails 106, in each track-section. Since the track-core 112 is very slightly higher than the level of the rail 106, the top surface of the wooden block 164 may be slightly inclined, as indicated at 165.

The ends of the track-sections T1, T2, etc., are squared off, as shown at 166 in Figs. 1 and 4, and aligned by means of dowel-pin joints 167, as shown in Fig. 3, the successive sections being tightly drawn together by means of turnbuckles 168 which engage notches not shown which are cut in the bottom flanges of the core-clamping angle-irons 113 of the frame-structures of the several track-sections.

The towing-car 103, which rides on the track-element of the linear motor, as shown in Figs. 1, 2 and 3, comprises a long flat top-plate 171 which is provided with a large number of lateral notches 172 for receiving a large number of wheels 173. It is also provided with a number of pairs of holes 174, between which is machined, on the underside, a number of transversely extending dovetail grooves 175 for making a dovetail joint with a large number of vertical, longitudinally extending laminations or magnetizable core-punchings 177 which make up the primary-winding core 177 of the linear motor. The stack of laminations 177 of the primary-winding core are clamped in place by means of two, longitudinally extending angle-irons 178 which are secured to the underside of the top-plate 171.

Extending longitudinally along the lateral edges of the top-plate 171, on the underside of said plate, are two side-pieces 180 carrying inwardly extending stub-shafts 184 on which the car wheels 173 are journalled.

The car wheels 173 are disposed, at frequent intervals, along the length of the car 103, and are provided with broad rims which roll on the tops of the track-rails 106. Most of the wheels are unflanged, but the four wheels at the front and rear of the car are provided with flanges 185, which, contrary to usual railway practice, are on the outside of these guide-wheels, so as to engage the outer edges of the rail-heads of the track-rails 106.

The primary core 177 which is carried by the car is provided with a three-phase primary winding 190, which is shown in Fig. 3.

The towing-car 103 is also provided with two current-collecting mechanisms, enclosed in housings 191 disposed one on each side of the car. Each of the current-collecting mechanisms comprises a plurality of third-rail shoes 192 which are carried by the downwardly extending plows or support-members 193 which extend through slots between the pair of cap-strips 163 at each side of the track, so that the two sets of third-rail shoes 192, on the two sides of the car 103, engage the two pairs of third-rails 141, one pair on each side of the track. In this manner, two of the phases of the three-phase supply are led into the primary windings 190 of the car, the third phase being obtained from the track-rails 106 in a manner which is common railway practice. The special collector-shoe design, which was developed for the purpose of handling the unprecedently high currents which had to be collected, constitutes the subject-matter of an application of Maurice F. Jones, Serial No. 506,199, filed October 14, 1943.

The precise arrangement of the three-phase cross-connectors 151, 152 and 153, under the track-rails 106 and the track-core 112, is shown more clearly in Fig. 4, wherein it is seen that these cross-connectors are made in subdivided parts, joined together under the middle of the track-section. Thus, the phase-A cross-connector 151 appears at the top, as it comes from one side of the track, and at the bottom of the group of cross-connectors coming from the other side of the track, the two phase-A track-connectors 151 being joined together, at the longitudinal center-line of the track-section, as indicated at 200. A similar joint 202 is made at the longitudinal center of the track-section between the two phase-C cross-connectors 153, which come from the bottom of the stack of cross-connectors, on one side of the stack, and the top of the stack of cross-connectors, on the other side of the track, as plainly shown in plan view in Fig. 4. At the center where the joints 200 and 202 are made, the two phases A and C of the cross-connectors 151 and 153 are displaced out of vertical alignment with each other. The two intermediate, or phase-B, cross-connectors 152 are bent out of the vertical plane of the stack of cross-connectors, near the center of the track-section, as indicated at 203 and 204, and these two ends are joined by a short conductor 205 which is, in turn, joined, by the previously mentioned conductor 154, to the bottom flange of one of the cross-ties 104.

While we have illustrated our invention in but a single form of embodiment, we desire it to be understood that this embodiment is only by way of illustration, and that our invention, in its broader aspects, is susceptible of many changes by way of addition, simplification, and substitution of equivalents. We desire, therefore, that our appended claims shall be accorded the broadest construction consistent with their language.

We claim as our invention:

1. A three-phase system comprising a track comprising a pair of track-rails, a set of three three-phase feeder-conductors disposed along each side of the track, a plurality of sets of three three-phase cross-connectors extending under the track-rails and joining the corresponding phases of the two sets of feeder-conductors at a plurality of spaced points along the track, connections between a first phase of each of said sets of cross-connectors and the track-rails of the track, a three-phase motored car operative on said track-rails and deriving one phase of its electrical energy from said track-rails, a current-collecting means on one side of the car for deriving a second phase of its electrical energy from the corresponding phase of the set of feeder-conductors on that side of the track, and a second current-collecting means on the other side of the car for deriving a third phase of the set of feeder-conductors on that side of the track.

2. The invention as defined in claim 1, characterized by each set of feeder-conductors comprising three flat strips of non-magnetizable conducting-material with the flat sides of successive strips closely spaced from each other.

3. The invention as defined in claim 1, characterized by each set of feeder-conductors and each set of cross-connectors comprising three flat strips of non-magnetizable conducting-material with the flat sides of successive strips closely spaced from each other.

4. The invention as defined in claim 1, characterized by each set of feeder-conductors and each set of cross-connectors comprising three flat strips of non-magnetizable conducting-material with the flat sides of successive strips closely spaced from each other, the three strips of each set of cross-connectors being disposed one above another, the upper and lower cross-connectors being transposed at some intermediate point, the phase which is connected to the track-rails being the middle strip of both of the sets of feeder-conductors and all of the sets of cross-connectors.

5. A three-phase system comprising a track comprising a pair of relatively high-impedance track-rails, a relatively high-impedance third-rail structure on each side of the track, a three-phase-motored car operative on said track-rails and having current-collecting means engaging said third-rail structures, a set of three three-phase feeder-conductors of non-magnetizable conducting-material disposed alongside of each third-rail structure, one set of feeder-conductors having one phase thereof connected to its associated third-rail structure, the other set of feeder-conductors having a second phase thereof connected to its associated third-rail structure on the other side of the track, a plurality of sets of three three-phase cross-connectors extending under the track-rails and joining the corresponding phases of the two sets of feeder-conductors at a plurality of spaced points along the track, and connections between the third phase of each of said sets of cross-connectors and the track-rails of the track.

6. A track-element of a polyphase linear motor, comprising a plurality of at least partially prefabricated track-sections, each track-section comprising a supporting-structure squared at the ends for abutting with the next track-section, means for aligning and drawing together the abutting track-sections, said supporting-structure of each track-section comprising a plurality of cross-ties, said cross-ties having means for seating and aligning two track-rails, a third-rail structure at each side of each track-section, outside of the track-rails, insulators for supporting said third-rail structures from said supporting-structure, a plurality of other phase-conductors alongside of each third-rail structure at each side of each track-section, polyphase electric connection-means between successive track-sections for the third-rail structure and the other phase-conductors on each side of the track-element, each of a plurality of said track-sections having polyphase cross-connectors extending under the track-rails and joining corresponding phases of the third-rail structures and the other phase-conductors on opposite sides of the track, the third-rail structures being of two different phases, and connecting-means between a third phase of said cross-connectors and a track-rail.

7. A linear motor comprising a squirrel-cage track-element and a polyphase-motored car cooperating therewith; said track-element comprising a plurality of at least partially prefabricated track-sections, a pair of relatively high-impedance track-rails therefor, each track-section comprising a supporting-structure squared at the ends for abutting with the next track-section, means for aligning and drawing together the abutting track-sections, said supporting-structure of each track-section comprising a plurality of cross-ties, said cross-ties having means for seating and aligning two track-rails, each track-section having a laminated squirrel-cage core structure connected to said cross-ties between the track-rails, a relatively high-impedance third-rail structure at each side of each track-section, outside of the track-rails, insulators for supporting said third-rail structures from said supporting-structure, a set of polyphase non-magnetizable feeder-conductors alongside of each third-rail structure at each side of each track-section, one set of feeder-conductors having one phase thereof connected to its associated third-rail structure, the other set of feeder-conductors having a second phase thereof connected to its associated third-rail structure on the other side of the track-section, polyphase electric connection-means between successive track-sections for the feeder conductors on each side of the track-element, each of a plurality of said track-sections having polyphase non-magnetizable cross-connectors extending under the track-rails and joining corresponding phases of the feeder-conductors on opposite sides of the track-section, and connecting-means between a third phase of said cross-connectors and a track-rail; said car having a laminated polyphase-wound core-structure in cooperative relation to said squirrel-cage core-structure, and current-collecting means engaging said third-rail structures.

MAURICE F. JONES.
LEE A. KILGORE.